Dec. 2, 1947.  M. VAN METER  2,431,848
BRAKE SYSTEM
Filed Nov. 17, 1944
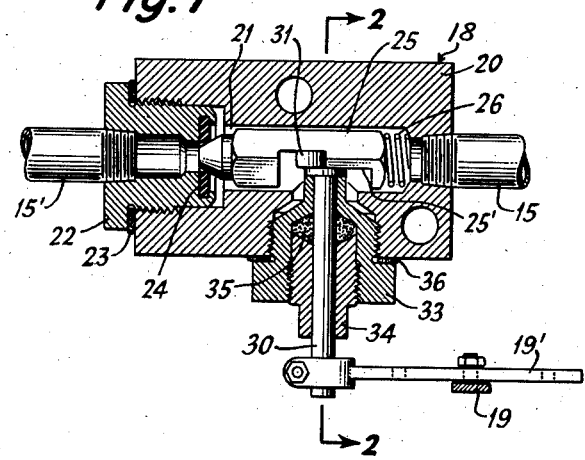
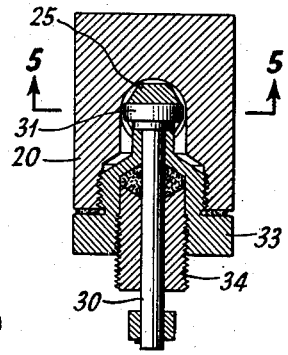
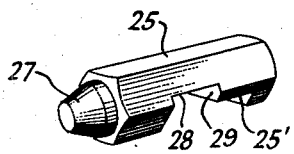
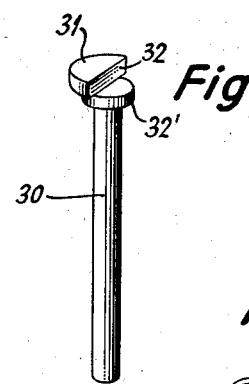
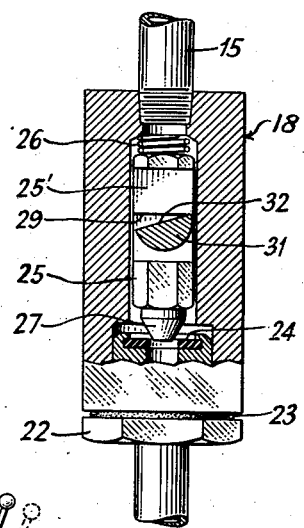
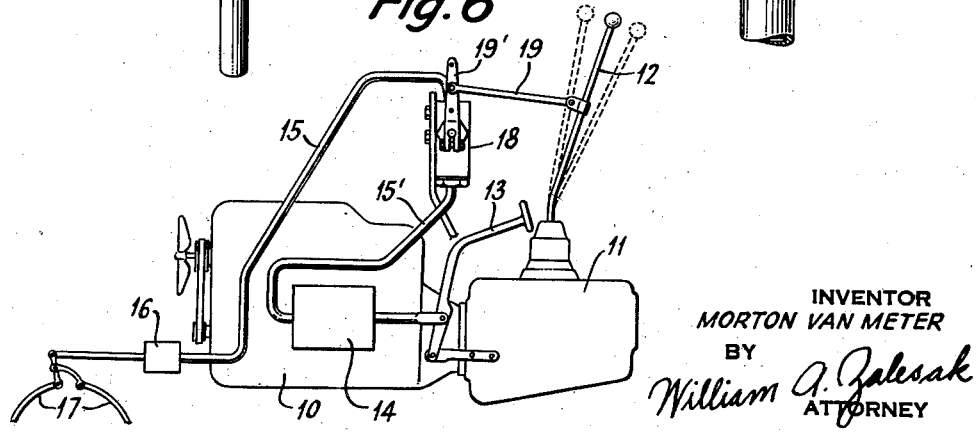
INVENTOR
MORTON VAN METER
BY
William A. Zalesak
ATTORNEY Patented Dec. 2, 1947

2,431,848

UNITED STATES PATENT OFFICE 2,431,848

BRAKE SYSTEM

Morton Van Meter, Union, N. J.

Application November 17, 1944, Serial No. 563,839

4 Claims. (Cl. 192—4)

My invention relates to a brake system and more particularly to automatic means for locking brakes in a hydraulic brake system in braked position.

In motor driven vehicles, such as delivery trucks and the like, which are driven by a prime mover which must be engaged and disengaged from a transmission to control movement of the vehicle, constant starting and stopping requires frequent manipulation of the foot brake, the hand brake, and shift mechanism. The result of this is to require a great deal of physical effort which for all practical purposes is wasted and the consumption of additional time in operating the hand brake in starting and stopping the vehicle. In some cases the constant starting and stopping makes the driver careless in setting the brakes, resulting sometimes in uncontrolled movement of the vehicle with no attendant due to failure to properly set the brakes when the vehicle is stopped, thus causing hazards to persons and property and the resultant damage and financial loss.

It is therefore an object of my invention to provide an improved braking system for vehicles.

Another object of my invention is to provide such a system which is particularly suitable where frequent starting and stopping is encountered.

A further object of my invention is to provide such an improved braking system which reduces physical effort and saves time.

A further object of my invention is to provide such an improved braking system which is automatic in locking brakes when the vehicle is brought to a stop.

A still further object of my invention is the provision of such an improved braking system which automatically releases the system when the conventional shift lever is moved from a neutral position to any of its operating positions.

A still further object of my invention is to provide an improved check valve mechanism which is automatically controlled according to predetermined operating conditions.

A still further object of my invention is to provide such a system which will reduce the possibility of uncontrolled movement and thus hazards to persons and property.

These and other objects will appear hereinafter.

The novel features which I believe to be characteristic of my invention are set forth with particularity in the appended claims, but the invention itself will best be understood by reference to the following description taken in connection with the accompanying drawing in which Figure 1 is a longitudinal section showing details of valve assembly part of my invention, Figure 2 is a section taken along the line 2—2 of Figure 1, Figures 3 and 4 are perspectives showing details of construction of elements employed in Figures 1 and 2, Figure 5 is a longitudinal section along the line 5—5 of Figure 2, showing the device of Figure 1 with the valve in position where it cannot function and Figure 6 is a schematic showing of my invention applied to a vehicle having a prime mover and hydraulic brakes and utilizing the device shown in Figures 1 to 5, inclusive.

Referring to Figure 6, I show my invention applied to a motor driven vehicle employing a conventional gasoline driven motor but which may be applied to any power driven vehicle in which the prime mover is operatively connected to and disconnected from the driven means by a lever-operated transmission. The vehicle includes the usual motor 10 associated with the transmission 11 controlled by the conventional shift lever 12. The vehicle (not shown) is provided with hydraulic or fluid operated brakes and includes the usual brake pedal lever 13, the brake fluid reservoir 14, the hydraulic wheel cylinder 16 and brake 17 with the associated conduit system 15—15'. In accordance with my invention I mount between the fluid reservoir 14 and the brake piston (not shown) in cylinder 16 a device in the form of an automatically controlled check valve 18 which is in turn controlled by means of the shift lever 12, which is operably associated with the device 18 by means of the link 19 and lever 19'.

The arrangement is such that when the shift lever 12 is in neutral position, the check valve 18 is permitted to function and to maintain the brakes in locked position once the brake is applied to stop movement of the vehicle. In any other position of the shift lever the device 18 is adjusted to lock the brakes so that it does not interfere with the normal operation of the brake system as will be more fully described below.

The device 18 is shown in detail in Figures 1 to 5, inclusive, and includes the valve body 20 having a longitudinal chamber 21 therein, one end being closed by the valve seat member 22 screwed into position against the washer 23, rendering the device fluid-tight and supporting in its inner end a washer 24 which provides the valve seat. The valve proper 25 is slidably mounted within the chamber 21 for longitudinal movement and is normally biased or spring pressed to closed position by means of the spring 26. In the position shown the valve is free to move under pressure from left to right away from the valve seat to permit flow of fluid but is biased to closed position and prevents the flow of fluid from right to left when closed. The conduits 15' and 15 correspond to the conduits shown in Figure 6.

As shown in Figures 1 and 3, the valve 25 is provided with valve head 27 of conical shape which closes the port provided by the washer 24 and has a recessed portion 28 providing a cam surface 29 which cooperates with the valve, the construction of the cam element being shown in Figure 4. The cam element includes the stem 30 and cam 31 provided with a flat surface 32 mounted on the circular head 32'. The flat surface 25' of the valve engages and slides on the flat surface of element 32'. As shown in Figure 1 when the flat surface 32 of the cam contacts surface 29 the valve may function as a check valve. The cam is maintained in place by means of the gland nut 33 between which and the valve body is washer 36 to maintain the device fluid-tight, the packing 35 being maintained in position by means of the gland screw 34.

Rotation of the cam is accomplished by means of the operation of the lever 19'. When the cam is rotated from the position shown in Figure 1 in either direction the edges of the flat surface 32 contact the surface 29 of the valve as shown in Figure 5, pushing the valve to the neutral position indicated, maintaining it against the action of the biasing spring 26. In this position the normal flow of fluid through the device can take place. This is the position which the valve assumes when the shift lever 12 is in any position other than neutral position, which is the position of the elements shown in Figure 1.

In operation when the foot brake is applied to stop the vehicle, the shift lever 12 is moved to neutral position, thus permitting device 18 to function as a check valve. Removal of the pressure from the foot brake has no effect on the braking system since the flow of fluid from the brake cylinder 16 is prevented when the valve 25 moves to closed position. Thus the brakes remain applied until the shift lever is moved to any operating position. Therefore it is unnecessary to operate a hand brake and it is assured that whenever the vehicle is brought to a stop the brakes are locked so as to prevent any undesired movement. This eliminates the necessity for the hand brake and the operation of the hand brake and removes all dangers of undesired movement of the car. This not only saves fatigue but reduces the time required for starting and stopping a vehicle, which item becomes important when a great many deliveries must be made.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A locking device for use with a fluid brake system including a hollow body member having a chamber therein and an enlarged opening at one end of said chamber and an aperture in the other end communicating with said chamber, a valve seat having an aperture therein mounted within said enlarged opening, and a valve within said chamber movable between said valve seat and said aperture and having one end cooperating with said valve seat for closing the aperture in said valve seat, and spring means for biasing said valve to closed position, said valve having a recessed portion providing a flat surface transverse to the longitudinal axis of said valve, a cam having a flat surface contacting said flat surface on said valve and permitting movement of said valve to closed position when said flat surfaces are in contact but maintaining said valve in open position when said cam is rotated to move said flat surfaces out of contact.

2. In a hydraulic brake system for a power driven vehicle having a gear shift lever movable between a neutral position and power connecting positions, a fluid reservoir and a hydraulic brake mechanism associated with said reservoir, a brake locking device for use with said hydraulic brake system including an elongated hollow body member having at one end a valve seat provided with a first aperture therein and having a second aperture at the other end of said elongated hollow body member, a valve movable between said first and said second apertures and having a conical end cooperating with said first aperture for closing the first aperture, and means for biasing said valve to a closed position against said first aperture, said valve having a body portion, said body portion having a recess in one side thereof, said recess having flat parallel surfaces in different planes parallel to the longitudinal axis of said valve and a transverse flat surface extending between said parallel surfaces, a cam cooperating with said valve and having a pair of flat surfaces cooperating with said parallel surfaces and a transverse flat surface cooperating with the transverse flat surface on said valve, said cam permitting movement of said valve to close said first aperture when said transverse flat surfaces are in contact, and maintaining said valve between said apertures against said biasing means to render said valve ineffective when the cam is rotated to move said flat transverse surfaces out of contact, said cam having a stem extending through said body member and transversely of the longitudinal axis of said valve, and a lever secured to the outer end of the stem for rotating said cam and operatively associated with said gearshift lever, said cam being moved to a position to permit said transverse flat surfaces to contact to permit movement of said valve to close said first aperture to lock said brakes when said gearshift lever is in neutral position.

3. In a hydraulic brake system for a power driven vehicle having a fluid reservoir and a hydraulic brake mechanism associated with said reservoir, a brake locking device for use with said hydraulic brake system including an elongated hollow body member having at one end a valve seat provided with a first aperture therein and having a second aperture at the other end of said elongated hollow body member, a valve movable between said first and said second apertures and having a conical end cooperating with said first aperture for closing the first aperture, and means for biasing said valve to a closed position against said first aperture, said valve having a body portion, said body portion having a recess in one side thereof, said recess having flat parallel surfaces in different planes parallel to the longitudinal axis of said valve and a transverse flat surface extending between said parallel surfaces, a cam cooperating with said valve and having a pair of flat surfaces cooperating with said parallel surfaces and a transverse flat surface cooperating with the transverse flat surface on said valve, said cam permitting movement of said valve to close said first aperture when said transverse flat surfaces are in contact, and maintaining said valve between said apertures against said biasing means to render said valve ineffective when the cam is rotated to move said flat transverse surfaces out of contact, said cam having a stem extending through said body member and transversely of the longitudinal axis of said valve, and a lever secured to the outer end of the stem for rotating said cam.

4. In a hydraulic brake system for a power driven vehicle having a prime mover, a fluid reservoir and a hydraulic brake mechanism associated therewith, a brake locking device for use with said hydraulic brake system including an elongated hollow body member having at one end a valve seat provided with a first aperture therein and having a second aperture at the other end of said elongated hollow body member, a valve movable between said valve seat and said aperture and cooperating with the first aperture in said valve seat for closing said first aperture, and means for biasing said valve to close said first aperture, said valve having a body portion, said body portion having a recess in one side thereof, said recess having flat surface extending transversely of the longitudinal axis of said valve, a cam cooperating with said valve and having a flat surface cooperating with the transverse flat surface on said valve, said cam permitting movement of said valve to close said first aperture when said flat surfaces are in contact for maintaining said valve between said apertures against said biasing means to render said valve ineffective when the cam is rotated to move said flat surfaces out of contact, said cam having a stem extending through said body member and transversely of the longitudinal axis of said valve, and a lever secured to the outer end of the stem for rotating said cam and operatively associated with said prime mover whereby when said prime mover is disconnected from said vehicle, said cam is moved to a position to permit said transverse surfaces to contact to permit movement of said valve to close said first aperture.

MORTON VAN METER.

REFERENCES CITED

The following references are of record in the file of this patent:

UNITED STATES PATENTS

| Number | Name | Date |
| --- | --- | --- |
| 2,018,351 | Freeman | Oct. 22, 1935 |
| 2,136,410 | Boldt et al. | Nov. 15, 1938 |
| 2,220,620 | Capen | Nov. 5, 1940 |
| 2,267,029 | Heyer | Dec. 23, 1941 |
| 2,298,509 | Phipps | Oct. 13, 1942 |
| 2,299,475 | Farmer | Oct. 20, 1942 |